US008220029B2

(12) United States Patent
Zhang et al.

(10) Patent No.: US 8,220,029 B2

(45) Date of Patent: Jul. 10, 2012

(54) METHOD AND SYSTEM FOR ENFORCING TRUSTED COMPUTING POLICIES IN A HYPERVISOR SECURITY MODULE ARCHITECTURE

(75) Inventors: Xinwen Zhang, San Jose, CA (US); Jean-Pierre Seifert, San Jose, CA (US)

(73) Assignee: Samsung Electronics Co., Ltd., Suwon (KR)

(*) Notice: Subject to any disclaimer, the term of this patent is extended or adjusted under 35 U.S.C. 154(b) by 958 days.

(21) Appl. No.: 11/985,015

(22) Filed: Nov. 13, 2007

(65) Prior Publication Data

US 2009/0125974 A1 May 14, 2009

(51) Int. Cl.
*G06F 9/445* (2006.01)
*G06F 9/40* (2006.01)

(52) U.S. Cl. ........................................... 726/1; 713/164

(58) Field of Classification Search ........................ None
See application file for complete search history.

(56) References Cited

U.S. PATENT DOCUMENTS

2008/0184335 A1 7/2008 Zhang et al.
2008/0244569 A1* 10/2008 Challener et al. ................ 718/1

OTHER PUBLICATIONS

Barham et al. Xen and the Art of Virtualization, ACM Dec. 2003[online], [retrieved on Dec. 28, 2010]. Retreived from Google Scholar.*
Sailer et al. Building a MAC-Based Security Architecture for the Xen Open-Source Hypervisor, ACS Dec. 2005[online], [retrieved on Dec. 28, 2010]. Retreived from Google Scholar.*
Proof of Date for ACM Article.*
Proof of Date for ACS Article.*
Towards a VMM-based Usage Control Framework for OS Kernel Integrity Protection. Jun. 20-22, 2007. ACM. Xu et al.*
Justifying Integrity Using a Virtual Machine Verifier. Schiffman et al.*
Trusted Computing Group timeline, Trusted Computing Group, pp. 1-3, Apr. 2009, US.
SELinux: Information Assurance Through Partnership, National Security Agency, pp. 1-9, Mar. 14, 2007, US.
TPM Main Parts 1-3, Specification Version 1.2, Level 2 Revision 103, Jul. 9, 2007, pp. 1-170 (Part 1), 1-186(Part 2), 1-318 (part 3), US.

* cited by examiner

*Primary Examiner* — Venkat Perungavoor
(74) *Attorney, Agent, or Firm* — Beyer Law Group LLP

(57) ABSTRACT

A method and system for enforcing trusted computing (TC) policies in a security module architecture for a hypervisor. Upon receiving a request from a subject for access to an object, TC-related attribute values are obtained for the subject and the object based on a virtualized trusted platform module (vTPM). Access control decisions are the made based at least on the TC-related attribute values and TC-related policies.

20 Claims, 5 Drawing Sheets

METHOD AND SYSTEM FOR ENFORCING TRUSTED COMPUTING POLICIES IN A HYPERVISOR SECURITY MODULE ARCHITECTURE

FIELD OF THE INVENTION

The present invention relates to enforcing security policies in computing environments, and in particular to enforcing Trusted Computing policies in computing environments.

BACKGROUND OF THE INVENTION

A computing system typically includes hardware such as processors and memory, and software such as an operating system (OS) which functions as an agent between application programs and the hardware. Many computing systems include multiple processors, and a number of computing environments also include a security module. An example of a security module is a trusted platform module (TPM) comprising a hardware module that enforces security. An example TPM specification is published by the Trusted Computing Group (TCG) at www.trustedcomputinggroup.org/home. When a computing system with a TPM receives processing requests, the computing system enforces security policies based on the TPM verification.

An area of interest for providing security is in virtualization which involves a process of simulating several virtual machines (VMs), each running a separate operating system instance. Each OS may run in a different VM. For example, Xen is a virtual machine monitor (VMM), also know as a hypervisor, for managing the VMs that execute on a host machine to provide the functionality of several guest operating systems on top of the host, on the same computer hardware at the same time.

The Xen Security Module (XSM) is in development by the National Security Agency (NSA). The XSM is a security architecture implemented in the Xen hypervisor for controlling accesses to hardware resources from individual VMs running beyond the hypervisor and inter-VM communications. The basic architecture of the XSM is derived from Security Enhanced Linux (SELinux). SELinux is an initiative by the NSA (http://www.nsa.gov/selinux/), which uses Mandatory Access Control (MAC) mechanisms that provide only those necessary accesses a program needs to perform its task (also known as the principle of least privilege).

SELinux is an implementation of MAC using Linux Security Modules (LSM) in the Linux kernel, based on the principle of least privilege. A Linux kernel integrating SELinux enforces MAC policies (access control policies) that confine user programs/processes and system servers to the minimum amount of privilege they require for performing tasks. This is independent of the traditional Linux access control mechanisms.

Similar to SELinux, the access control policies in XSM are based on static attributes such as domain or subject types and labels, such that dynamic trusted computing (TC) attributes such as TC-related information cannot be supported. TC is a technology developed and promoted by the Trusted Computing Group (https://www.trustedcomputinggroup.org/home). Typical TC-related information includes the configuration of the host and VMs, the running state of the VMs, the loading and running integrity of the VMM and VMs. TC policies are security requirements according to TC-related attributes or information. For example, policies such as "A VM can access a resource or talk to another VM only when both are running in a good state" cannot be enforced in XSM.

IBM developed a secure hypervisor (sHype) based on the Xen hypervisor to control accesses to virtualized resources and to control information flow between VMs. However, sHype becomes an example policy module in XSM, and only enforces policies based on VM labels, making it unsuitable for enforcing trusted computing policies.

BRIEF SUMMARY OF THE INVENTION

The present invention provides a method and system for enforcing trusted computing policies in a hypervisor security module architecture. In one embodiment, a method and system for enforcing trusted computing (TC) policies in a security module architecture for a hypervisor is provided. Upon receiving a request from a subject for access to an object, TC-related attribute values are obtained for the subject and the object based on a virtualized trusted platform module (vTPM). Access control decisions are then made based on at least TC-related attribute values and TC-related policies.

In one implementation, the hypervisor provided virtualized resources for VMs. Trusted Computing policies are enforced in an XSM architecture for a Xen hypervisor. The XSM architecture is integrated with TC technologies, and the XSM security architecture is leveraged to enforce TC policies by making access control decisions based at least on the TC-related attribute values and TC-related policies.

These and other features, aspects and advantages of the present invention will become understood with reference to the following description, appended claims and accompanying figures.

DETAILED DESCRIPTION OF THE INVENTION

The present invention provides a method and system for enforcing Trusted Computing (TC) policies in a security module architecture for a hypervisor. In one embodiment, this involves enforcing Trusted Computing policies in a Xen Security Module (XSM) architecture for a Xen hypervisor, by integrating the XSM architecture with TC technologies, and leveraging the XSM security architecture to enforce TC policies. In one implementation, computing system architecture according to the present invention integrates the virtualized trusted platform module (vTPM) architecture with the XSM architecture to enforce TC policies. As such, the computing system architecture is implemented on the standard virtualization technology vTPM specified by the Trusted Computing Group (TCG).

Figure 1:
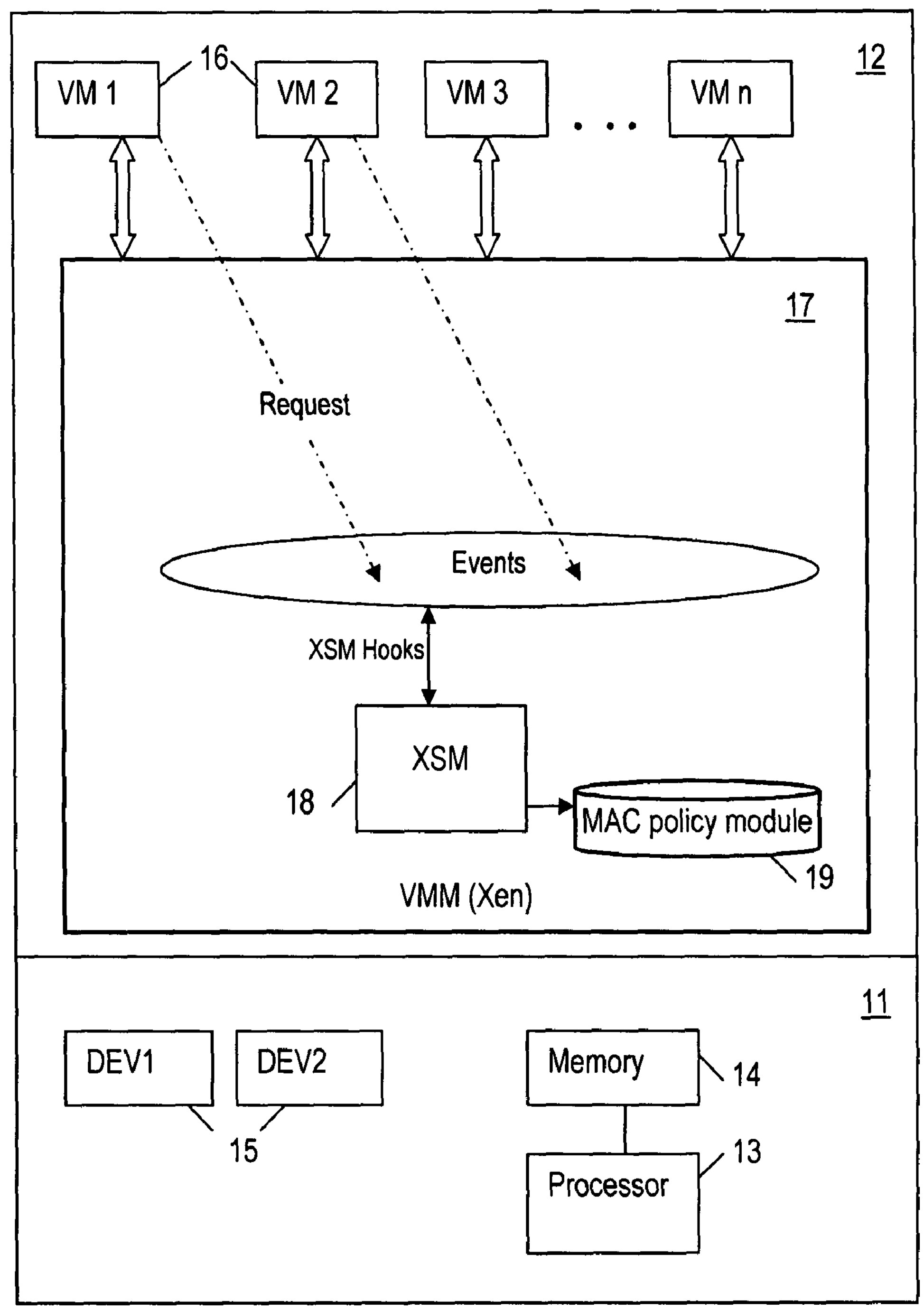
FIG. 1 shows a functional block diagram of a conventional Xen computing environment that includes hardware resources and software resources.

FIG. 1 shows a functional block diagram of a conventional Xen computing environment 10 that includes hardware resources 11 and software resources 12. The hardware resources 11 include a processor 13, memory 14, and devices 15 (DEV1, DEV 2). The software resources 12 includes multiple VMs 16 (VM 1, . . . , VM n) that are managed by a Xen hypervisor 17. The Xen hypervisor 17 provides virtualized resources to the individual VMs. However, when an event such as an access request occurs, the Xen hypervisor 17 alone cannot control access to the hardware resources from the VMs such that virtualized resources belonging to a VM are not accessed and compromised by another, unauthorized VM. A XSM 18 provides a general security mechanism for the Xen hypervisor 17 to control VM inter-communication such as information flow control between VMs, according to security requirements. The XSM 18, which is derived from SELinux, can support MAC policies based on the security labels of VMs and resources. As shown in FIG. 1, the policies in XSM are implemented with a MAC policy module 19.

Figure 2:
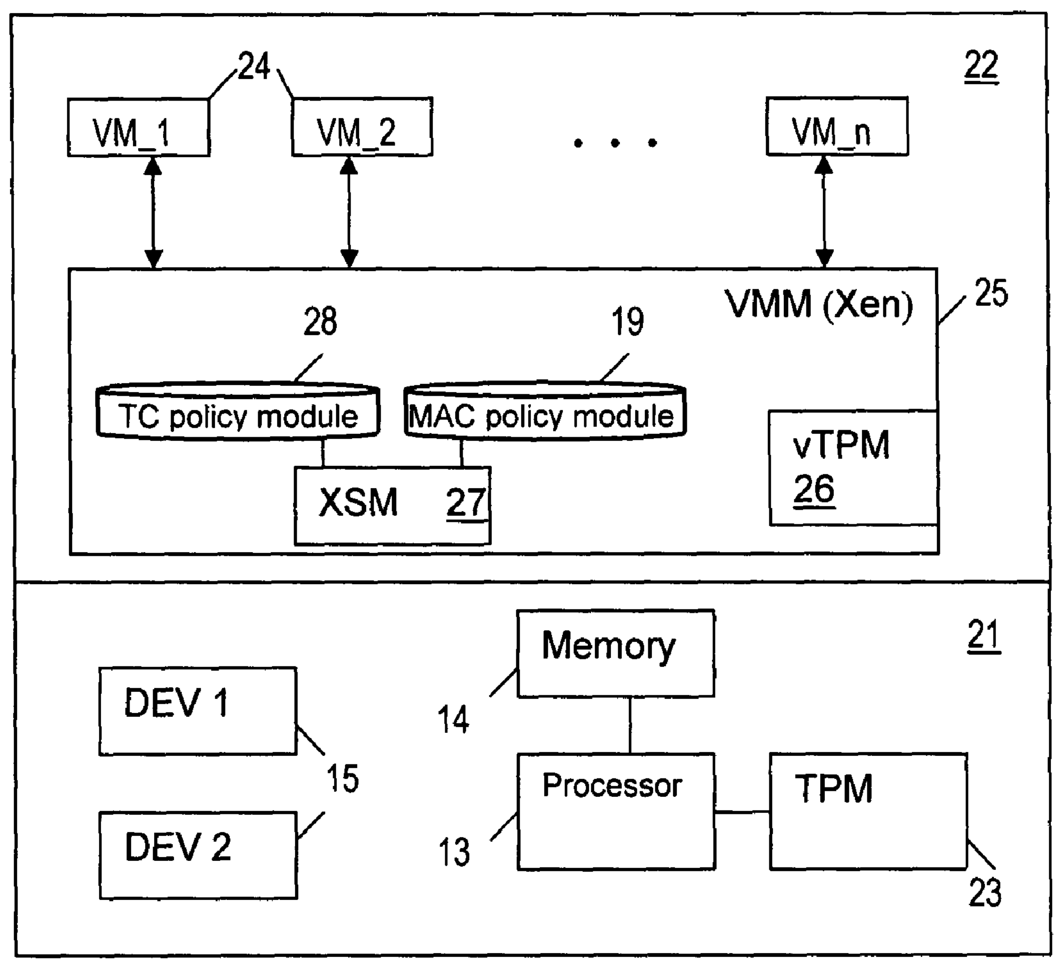
FIG. 2 shows a functional block diagram of the architecture of a computing system for enforcing Trusted Computing policies in an XSM architecture for a Xen hypervisor, according to an embodiment of the present invention.

FIG. 2 shows a functional block diagram of the architecture of a computing system 20 according to an embodiment of the present invention. The computing system includes hardware resources 21 and software resources 22. The hardware resources 21 include a processor 13, memory 14, a TPM 23 and devices 15 (DEV 1, DEV 2). The software resources 22 include multiple VMs 24 that are managed by a Xen hypervisor (VMM) 25. The hypervisor 25 includes a virtualized Trusted Platform Module (vTPM) logical module 26 that provides TPM type functionality. The hypervisor 25 provides virtualized hardware/software resources to the individual VMs. A XSM 27 provides a general security mechanism for the hypervisor 25 to control inter-communication such as information flow control between VMs, based on security requirements according to the present invention.

The security policy enforcement by XSM is extended by introducing TC-related attributes in access control policies, wherein TC requirements such as VM booting status and runtime states/configurations can be specified in XSM. The XSM security architecture is integrated with the vTPM 26 such that TC-related information in a TC policy module 28 can be obtained at the hypervisor level and enforced by the XSM 27. To support TC properties of VMs, the computing system 20 leverages the vTPM 26 to provide TC-related attribute values for processes (subjects and objects), to policy decision points of the XSM 27 for allowing/denying access requests.

Figure 3:
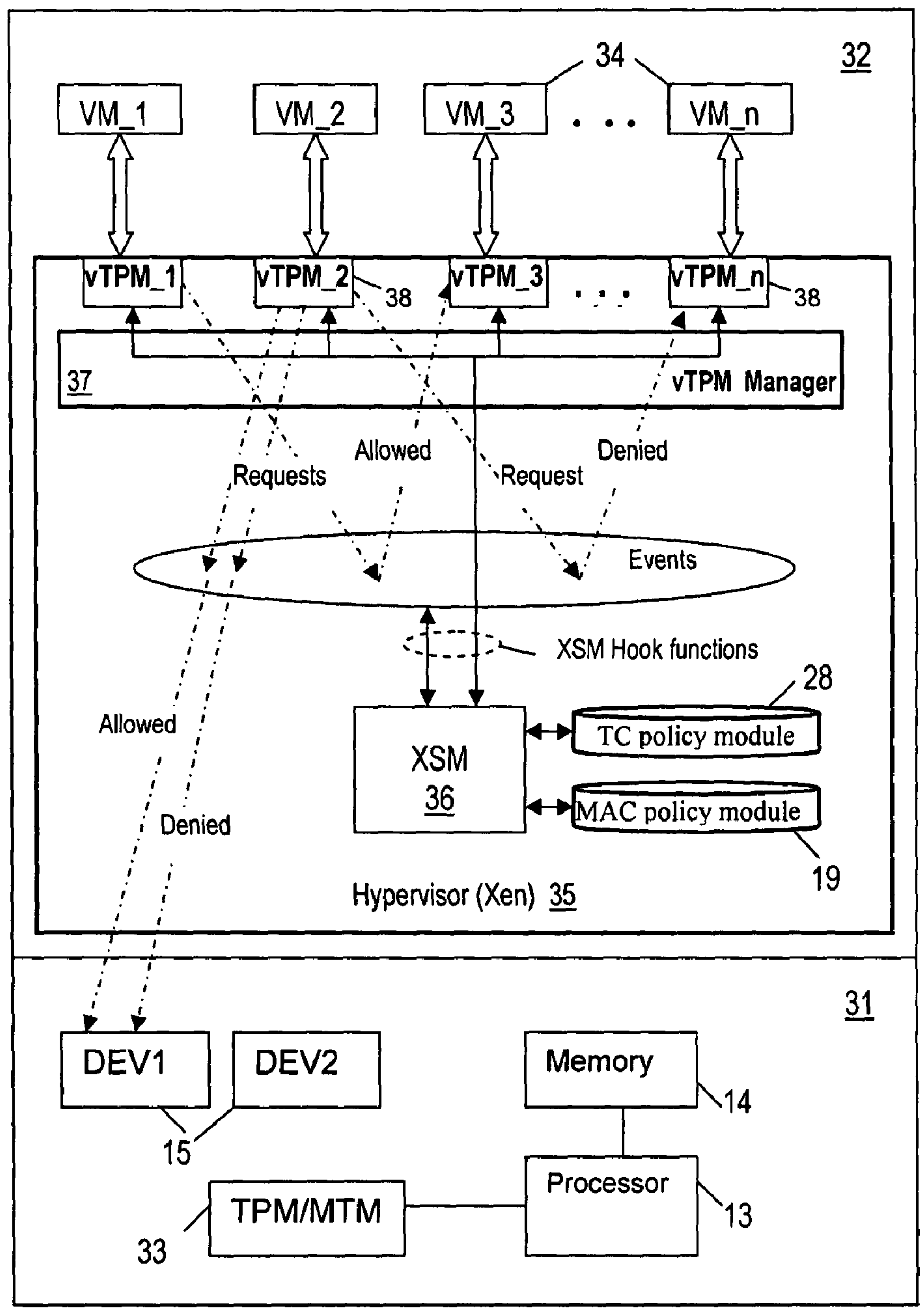
FIG. 3 shows a functional block diagram of another computing system for enforcing TC policies in an XSM architecture for a Xen hypervisor, according to an embodiment of the present invention.

FIG. 3 shows a functional block diagram of another computing system 30 according to an embodiment of the present invention, wherein XSM security architecture is integrated with vTPM such that TC-related information is obtained at the hypervisor level and enforced by XSM with a TC policy module.

The computing system 30 includes hardware resources 31 and software resources 32. The hardware resources 31 include a processor 13, memory 14 and a TPM 33. The software resources 32 include multiple VMs 34 (VM_1, . . . , VM_n) that are managed by a Xen hypervisor (VMM) 35. The Xen hypervisor 35 provides virtualized resources to the individual VMs. A XSM 36 provides a general security mechanism for the hypervisor 35 according to security requirements of the TC policy module 28 and the MAC policy module 19.

In order to support TC policies by the XSM 36, the TPM hardware is virtualized by a vTPM manager 37 such that, logically, each VM 34 has a vTPM 38 as its root-of-trust. The vTPM manager 37 is implemented in the hypervisor 35 to create instances of vTPMs 38 and manage their data structures. The vTPM manager 37 manages platform configuration registers (PCRs) for the VMs. As described in more detail below, the PCRs are used to store integrity values measured during VM boot time and runtime.

When an event such as an access request is received from a VM, a corresponding XSM hook function defined in the hypervisor 35 queries the vTPM manager 37 to obtain the integrity values of the involved source (subject) and/or target (object) VMs. The request is then forwarded to the XSM 36 which makes a deny/allow decision based at least on TC module policies 28 and returns the decision to the XSM hook function. If the access request is allowed according to the TC policies then the XSM hook functions allow the access request. Conceptually, the XSM hook functions can be called policy enforcement point (PEP) functions. Traditional XSM policies can also be enforced with an existing MAC policy 19.

Figure 4:
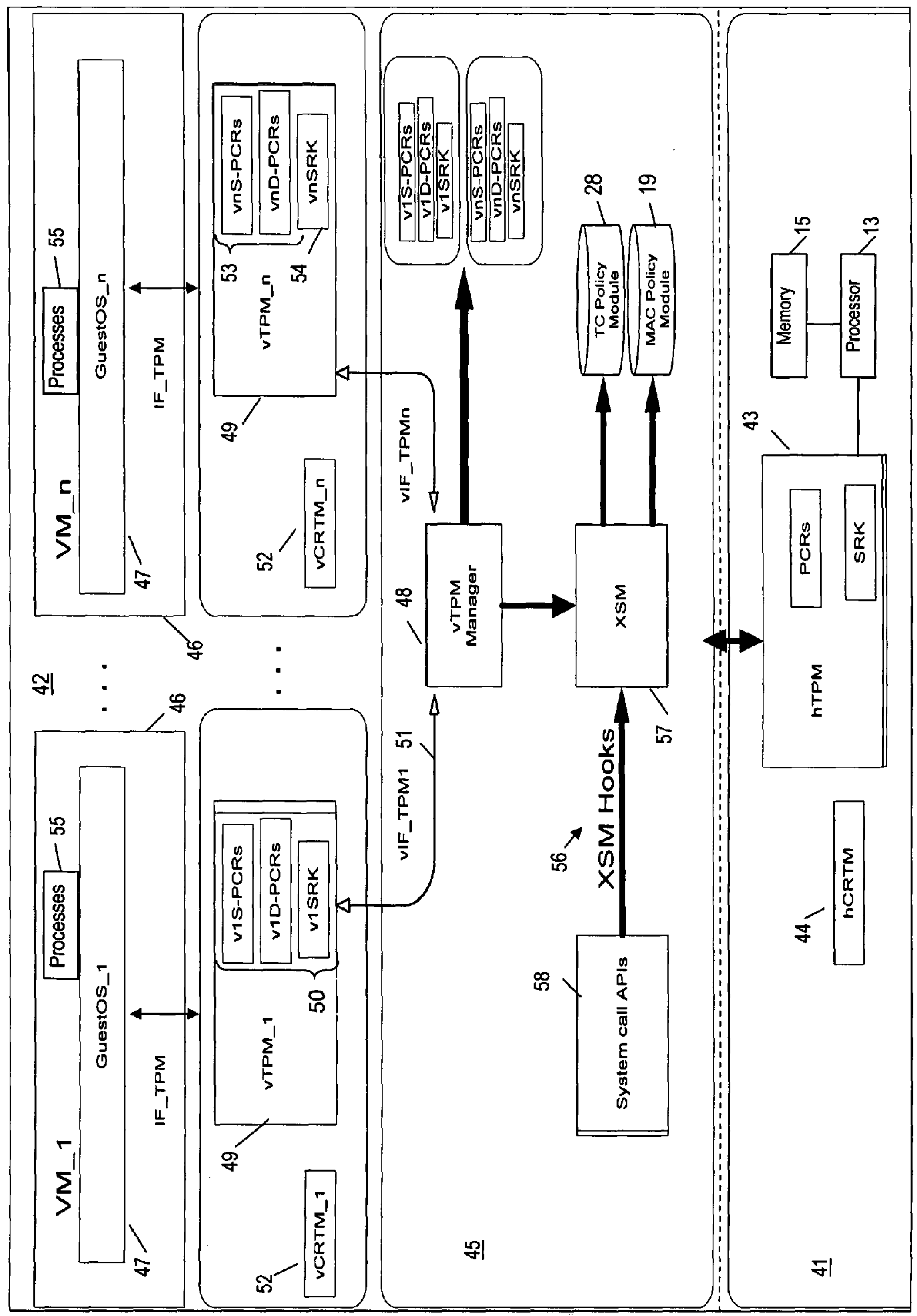
FIG. 4 shows a functional block diagram of an example implementation of the computing system of FIG. 3, according to the present invention.

FIG. 4 shows a functional block diagram of a computing system 40 which is an example implementation of the computing system in FIG. 3. The computing system 40 includes hardware resources 41 and hardware software resources 42. The hardware resources 41 include one or more processors 13, memory 15 and a physical TPM (hTPM) 43 with a Core Root of Trust Measurement (hCRTM) 44.

The software resources 42 include a Xen hypervisor 45 that provides virtualized (or isolated) resources to individual VMs 46 (VM_1, . . . , VM_n). Guest OS instances 47 (Guest OS_1, . . . , GuestOS_n) are virtualized operating systems in the VMs. A vTPM manager 48 is implemented in the hypervisor 45. When a new VM is created by the hypervisor 45, the vTPM manager 48 creates a corresponding vTPM instance 49 and allocates corresponding data structures 50 therein. The hypervisor 45 passes vTPM commands of a GuestOS 47 in a VM to the vTPM manager 48 via a logical vIF_TPM interface 51. All commands to a vTPM 49 are handled by the vTPM manager 48.

The vTPM manager 48 creates, manages and destroys vTPM instances (vTPM_1, . . . , vTPM_n). Upon creation of each VM by the hypervisor 45, the vTPM manager 48 creates a vTPM instance 49 and a corresponding Virtualized Core Root of Trust Measurement (vCRTM) instance 52, whereby the vCRTM instances 52 (vCRTM_1, . . . , vCRT_n), are associated with the vTPM instances 49 (vTPM_1, . . . , vTPM_n). For each new VM, the vTPM manager 48 also allocates memory for corresponding vTPM PCRs 53 and a virtualized storage root key (vSRK) 54. As such, for the VMs (VM_1, . . . , VM_n), the vTPM manager 48 allocates corresponding vTPM PCRs (v1D-PCRs, . . . , vnD-PCRs and v1S-PCRs, . . . , vnS-PCRs) and virtualized storage root keys (v1SRK, . . . , vnSRK). The vTPM manager 48 maintains the memory space for PCRs of the vTPM instances, whereby the PCRs of each vTPM are created, managed and protected by the vTPM manager 48.

The hypervisor 45 boots each VM with the allocated vCRTM and vTPM as a root-of-trust. The integrity of all the booting components of each VM (boot loader, BIOS, GuestOS) are measured and stored in the vTPM PCRs, maintained by the vTPM manager 48. After each GuestOS 47 is loaded, the integrity of the associated processes (applications) 55 are measured by the GuestOS 47 and the integrity values are stored in the corresponding vTPM PCRs before the processes run in the GuestOS 47. As such, PCRs are used to store integrity values measured during VM boot time and runtime. For example, a GuestOS measures the integrity of a process 55 before it is loaded and stores it in a PCR of its vTPM. When that process 55 generates access requests that are captured by XSM hook functions 56 in the hypervisor 45, a XSM 57 obtains an integrity value for the process 55 from the vTPM manager 48, to make an allow/deny decision based on the obtained integrity value and TC-related access policies. Integrity measurement and storage are supported by TPM specifications.

System call functions (APIs) 58 in the hypervisor 45 implement system functions, such as VM management (create/destroy/restore VM), event channels (communication channel between VMs), share memory operations between VMs, etc. The VMs use the system call functions 58 to access hardware resources or call other VMs. The XSM hook functions 56 are invoked to forward access requests to the XSM 57 to make decisions based at least on TC-related policies in a TC policy module 28. Using the XSM 57, the hypervisor 45 controls communications between VMs and also controls access from VMs to the hardware and software resources 41, 42, respectively.

In one implementation, a set of rules in the policy modules specify the circumstances under which an accessing process (i.e., subject) can access a software/hardware resource (i.e., object). The XSM 57 accepts access requests forwarded by the XSM hook functions 56, and makes access decision based on rules in the TC policy module 28 and the MAC policy module 19. The MAC policy module 19 includes policies defined by the types of processes and VMs or other general security labels.

The TC policy module 28 includes policies defined based on TC-related attributes, such as integrity values in vTPM instances. For example, in TC a program can only access a file or open a connection or revoke a service when the program is running in a good state and its runtime integrity is verified before the access. Based on the rules, the XSM decides if an access request is permitted or denied.

Figure 5:
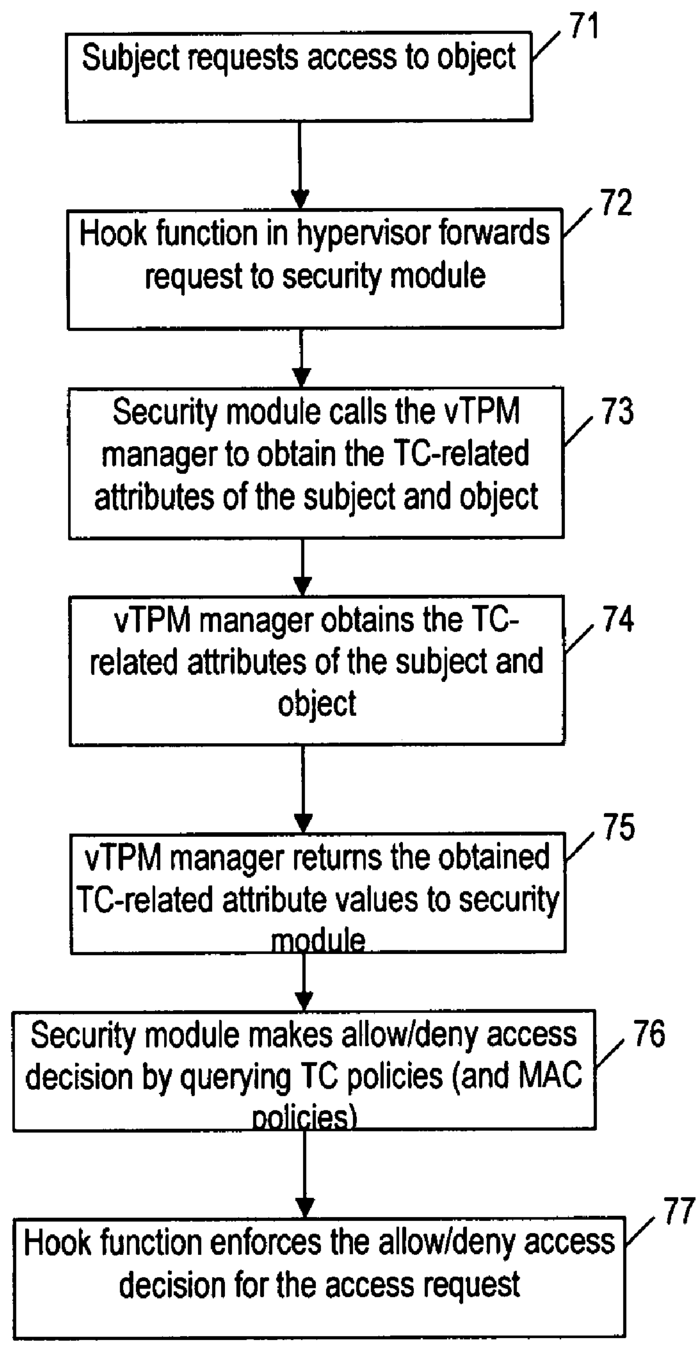
FIG. 5 shows an example process for enforcing Trusted Computing policies in an XSM architecture for a Xen hypervisor, according to an embodiment of the present invention.

FIG. 5 shows an example process 70 for enforcing Trusted Computing policies in an XSM architecture for a Xen hypervisor, according to an embodiment of the present invention, including the steps of:

Step 71: A subject process in a GuestOS of a subject VM generates a system call (request) to access an object process in a GuestOS of an object VM.

Step 72: A corresponding XSM hook function defined in the Xen system call APIs receives the request, and forwards it to the XSM, along with subject/object information including the original attributes of the subject VM and process (e.g., type or other security label).

Step 73: The XSM calls the vTPM manager to obtain the TC-related attribute values for the subject and the object (e.g., their integrity values).

Step 74: The vTPM manager obtains the PCRs of the subject/object VMs. The PCRs provide integrity values measured during VM boot time and runtime, such as when a GuestOS measures the integrity of a subject application before it is loaded, and stores the measured values in a PCR of its vTPM. When the subject application generates an access request which is captured by a corresponding XSM hook function in the Xen hypervisor, the XSM module obtains the integrity value of the subject application from the vTPM manager. Integrity measurement and storage are supported by the TPM specifications.

Step 75: The vTPM manager returns the TC-related attribute values for the subject VM and process to the XSM.

Step 76: The XSM makes access control decisions based on two types of policies, by: (1) querying the TC policy module with the TC-related attribute values (e.g., integrity values), and (2) querying the MAC policy module with types or other security labels for the subject/object. If both the TC policy module and the MAC policy module have policies to allow this access request (based on the TC-related attribute values and types or other security labels, for the subject/object), then the XSM returns an "allowed" decision to the XSM hook function, otherwise the XSM returns a "denied" decision to the XSM hook function.

Step 77: The XSM hook function (the Xen hypervisor system function) obtains the decision from the XSM and enforces it (i.e., allows the access request if the XSM returns an "allowed" decision, and denies the access request if the XSM returns a "denied" decision). For example, if XSM returns "allowed", the XSM hook function allows the system call function to complete the access operation (e.g., build a communication channel between the subject VM and the object VM for communication between the subject process and the object process). Otherwise, the system call function returns an exception to the requesting process in a VM.

Typically an access request is conducted by calling a Xen system call function by a GuestOS. An access request can be as: (1) a request for the Xen hypervisor to create/destroy/restore/start/shutdown a VM, (2) an application in GuestOS_1 desired to communicate with another application in GuestOS_2, wherein Xen creates an event channel between them for communication, (3) VM1 desires to share some memory space with VM_2, etc.

The vTPM manager provides the integrity of the involved source (subject) and/or target (object) VMs. The integrity of a process is the result of a hash function (e.g., SHA1) of the program files of the process. The integrity of a data file is the result of a hash function of the file. The integrity of a VM is the integrity values of its boot components (boot loader, BIOS, OS).

A TPM is located in a TC-enabled device. In Trusted Computing, devices are equipped with the TPM as a hardware chip that uses cryptographic mechanisms to certify the integrity of the (application/system) software running on the device, and to protect I/O and storage of data inside the device. This practice is designed to effectively fight against malicious code, viruses and invasion of privacy. This is because prior practices for protecting against malicious code and other threats purely at the software level have been lacking. It has been learned that a trusted and tamper-proof security basis cannot be achieved using software based solutions alone. As such, the Trusted Computing Group specifies Trusted devices such as PCs, PDAs, mobile phones, which include the TPM, in order to make electronic applications (e.g., e-commerce, e-health and e-government) more trustworthy.

The TPM provides secure storage and key generation capabilities for generating and storing user and platform identity information utilized in authentication. Passwords can also be authenticated and protected through TPM. TPM also provides services to higher level services and applications by storing and reporting runtime and other information. According to the specifications for TC-enabled systems, TC-enabled systems (platforms) implement the following technical functionalities:

Integrity measurement, storage and reporting: Measure the integrity of important components during boot time and runtime, and store integrity values in the TPM, and report to other entities.

Protected I/O: All information sent via I/O devices such as monitors, sound cards, etc., should be encrypted in a way that only intended applications can capture the information.

Curtaining Memory Data stored in memory should be strictly isolated from other applications by means of encryption.

Sealed Storage: Permanent storage devices such as hard-drives should be in a sealed (encrypted) form so that only the originating application or device can read them. The objective is that if the data is moved from the sealed storage maliciously to another device, that data becomes un-readable.

Remote Attestation: Remotely certify to third parties in enciphered form, which software is running, whether malicious code has modified the corresponding software, the status of the hardware components, etc. This enables service providers to deploy their services across geographical boundaries.

TC services leverage the underlying TC hardware (i.e., the TPM). For example, platform and application integrity measurement is a TC service that measures key components of the systems (e.g., kernel images, configuration files, program images) and stores measured values in the TPM. In one implementation, this service is utilized (e.g., by the vTPM manager) to read these integrity values to send to the PEP functions for verification. The TPM provides secure storage and key generation capabilities, similar to other hardware authentication devices, so that it can be used to create and/or store both user and platform identity credentials for use in authentication. The TPM can also protect and authenticate user passwords, thereby providing an effective solution for integrating strong, multifactor authentication directly into the computing platform. With the addition of complementary technologies such as smart cards, tokens and biometrics, the TPM enables true machine and user authentication.

A TC policy may be defined as: a process in a VM can access another process in another VM (e.g., communicate with each other) only if the process has a known good integrity value, and the VM has a good integrity value. Policies can be defined with subject and/or object integrity values. A "known good value" is a hash value such that a component that has this integrity value is trusted, e.g., not maliciously changed or infected by a virus. The TC policy (security) module is a software module, including binary policies defined with TC-related attributes, e.g., integrity values of processes and VMs. Policies are defined by system or security administrators, according to security requirements of applications/processes running on a computing platform. Upon access request, the TC policy module provides another check in addition to that existing MAC policy module such that TC-related attributes can be considered in overall access control decisions. To enable a TC policy module, the typical XSM is modified to obtain TC-related attributes (particularly PCR values) from the vTPM Manager.

As those skilled in the art will recognize, other implementations of the present invention are possible. For example, the vTPM manger can be implemented either in the Xen hypervisor layer, or in a dedicated VM (e.g., a privileged dom (Dom0) in Xen), or in hardware. Obtaining TC-related information from a vTPM manager can be implemented either in XSM hook functions or in a TC security/policy module. The TC policy module can be checked before or after the traditional MAC policy module. The TC policy module can be stacked with an existing MAC policy module such that there is no modification for XSM hook functions.

The addition of hardware allows an implementation of TPM as a microcontroller that stores keys, passwords and digital certificates, enabling machine and user authentication. It can be included in any computing/electronic device (platform). The TPM ensures that the information stored in the device is made more secure from external software attack and physical theft.

As those skilled in the art of operating systems will appreciate, although the example herein are drawn to a Xen hypervisor and XSM, the present invention is useful with other hypervisors and security module architectures as well. As such, the scope of the present invention is not limited to the example embodiments described herein.

As is known to those skilled in the art, the aforementioned example architectures described above, according to the present invention, can be implemented in many ways, such as program instructions for execution by a processor, as computer program product on computer readable media, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. A computer-implemented method for extending security enforcement by a hypervisor to include enforcing trusted computing (TC) policies, comprising the steps of:

receiving a request from a subject for access to an object;

obtaining TC-related attribute values for the subject and the object based on a virtualized trusted platform module (vTPM) with the vTMP virtualizing TC functions of a trusted platform module (TMP) including TPM hardware such that, each virtual machine has an instance of a vTPM as its root of trust wherein obtaining TC-related attribute values includes obtaining integrity values for the TC-related attributes of the subject and the object; and making access control decisions based at least on the integrity values and TC-related policies using XSM hook functions wherein the hypervisor is a Xen hypervisor and a Xen Security Module (XSM) integrated with the vTPM is used to provide secure virtual machine intercommunication permitting access when a TC policy condition is satisfied for at least one of the obtained integrity values.

2. The method of claim 1, wherein:

the hypervisor provides virtualized resources for virtual machines (VMs); and the subject comprises a process in a subject VM requesting access to an object comprising a software resource.

3. The method of claim 1, wherein:

the hypervisor provides virtualized resources for virtual machines (VMs); and the subject comprises a process in a subject VM requesting access to an object comprising a hardware resource object.

4. The method of claim 1, wherein:

the hypervisor provides virtualized resources for virtual machines (VMs); and the subject comprises a process in a subject VM requesting access to an object comprising a process in an object VM.

5. The method of claim 1, wherein the Xen Security Module (XSM) comprises a trusted computing (TC) policy module and a MAC policy module, wherein the XSM enforces security requirements for virtual machine intercommunication based at least on the TC policy module.

6. An apparatus extending security enforcement by a hypervisor to include comprising:

a processing system including a processor;

a non-transitory machine accessible medium;

and instructions encoded in the machine accessible medium, wherein the instructions, when executed by the processing system, integrate a XEN Security Module with a Trusted Platform Module (TPM) including TPM hardware to cause the processing system to enforce trusted computing (TC) policies for a hypervisor providing virtualized resources for virtual machines (VMs), the processing system obtaining TC-related attribute values for the subject and the object based on a virtualized trusted platform module (vTPM) of the TC functions of the Trusted Platform Module wherein obtaining TC-related attribute values includes obtaining integrity values for the TC-related attributes of the subject and the object, wherein each virtual machine has an instance of a vTPM as its root of trust and making access control decisions based at least on the integrity values and TC-related policies using XSM hook functions wherein the hypervisor is a Xen hypervisor and a Xen Security Module (XSM) is used to provide secure virtual machine inter-communication permitting access when a TC policy condition is satisfied for at least one of the obtained integrity values.

7. The apparatus of claim 6, wherein the instructions, when executed, perform further operations comprising:

enforce trusted computing (TC) policies in a security module architecture for a hypervisor providing virtualized resources for virtual machines.

8. The apparatus of claim 7, wherein the security module architecture comprises a Xen Security Module (XSM).

9. The apparatus of claim 6, wherein the subject comprises a process in a subject VM requesting access to an object comprising a software resource.

10. The apparatus of claim 6, wherein the subject comprises a process in a subject VM requesting access to an object comprising a hardware resource object.

11. The apparatus of claim 6, wherein the subject comprises a process in a subject VM requesting access to an object comprising a process in an object VM.

12. A system for extending a hypervisor for enforcing trusted computing (TC) policies in a security module architecture for a hypervisor providing virtualized resources for virtual machines (VMs), comprising:

a trusted platform module (TPM) including TPM hardware;

an interface function configured for receiving a request from a subject for access to an object;

a manager to virtualize the trusted platform module and provide TC functions to the VMs, the manager configured for obtaining TC-related attribute values for the subject and the object based on a virtualized trusted platform module (vTPM), wherein each virtual machine has an instance of a vTPM as its root of trust and at least one of the TC-related attribute values includes an integrity value; and the system a security module configured for making access control decisions to allow access based at least on the obtained TC-related attribute values and TC-related policies using XSM hook functions wherein the hypervisor is a Xen hypervisor and a Xen Security Module (XSM) integrated with the vTPM is used to provide secure virtual machine inter-communication permitting access when a TC policy condition is satisfied associated with at least one integrity value of at least one of the subject and the object.

13. The system of claim 12, wherein the subject comprises a process in a subject VM requesting access to an object comprising a software resource.

14. The system of claim 12, wherein the subject comprises a process in a subject VM requesting access to an object comprising a hardware resource object.

15. The system of claim 12, wherein the subject comprises a process in a subject VM requesting access to an object comprising a process in an object VM.

16. The system of claim 12 further including a vTPM configured for maintaining TC-related attribute values for computing resources.

17. The system of claim 16, wherein the computing resources include software resources in a computing system.

18. The system of claim 16, wherein the computing resources include hardware resources in a computing system.

19. A program product stored on a non-transitory computer useable medium for enforcing trusted computing (TC) policies in a security module architecture for a hypervisor, the program product comprising program code for causing a computer system to perform the following steps:

receiving a request from a subject for access to an object;

obtaining TC-related attribute values including integrity values for the subject and the object based on a virtualized trusted platform module (vTPM), wherein each virtual machine has an instance of a vTPM as its root of trust; and making access control decisions based at least on the TC-related attribute values and TC-related policies using XSM hook functions wherein the hypervisor is a Xen hypervisor and a Xen Security Module (XSM) is integrated with the vTPM and is used to provide secure virtual machine inter-communication permitting access when a TC policy condition is satisfied for at least one of the obtained integrity values.

20. A computer-implemented method for enforcing trusted computing (TC) policies in a security module architecture for a hypervisor, comprising: receiving a request from a subject for access to an object; obtaining TC-related attribute values including integrity values for the subject and the object based on a virtualized trusted platform module (vTPM), wherein each virtual machine has an instance of a vTPM as its root of trust; and making access control decisions based at least on the TC-related attribute values and TC-related policies using XSM hook functions wherein the hypervisor is a Xen hypervisor and a Xen Security Module (XSM) is integrated with the vTPM and is used to provide secure virtual machine inter-communication permitting access when a TC policy condition is satisfied for at least one of the obtained integrity values.

* * * * *